United States Patent
Wuest et al.

(10) Patent No.: US 7,147,363 B1
(45) Date of Patent: Dec. 12, 2006

(54) DEVICE FOR THERMAL TREATMENT OF FLOUR FOR HYGENIC PURPOSES

(75) Inventors: Urs Wuest, Kronbuehl (CH); Willi Wetzel, Niederuzwil (CH)

(73) Assignee: Buhler AG, Uzwil (CH)

( * ) Notice: Subject to any disclaimer, the term of this patent is extended or adjusted under 35 U.S.C. 154(b) by 0 days.

(21) Appl. No.: 09/890,055

(22) PCT Filed: Feb. 10, 2000

(86) PCT No.: PCT/CH00/00076

§ 371 (c)(1),
(2), (4) Date: Sep. 12, 2002

(87) PCT Pub. No.: WO00/60958

PCT Pub. Date: Oct. 19, 2000

(30) Foreign Application Priority Data

Apr. 8, 1999 (DE) ................................. 199 15 908

(51) Int. Cl.
*A23N 17/00* (2006.01)
(52) U.S. Cl. ................ 366/148; 366/155.1; 366/182.3; 366/182.4; 99/370; 426/465; 426/519; 426/521
(58) Field of Classification Search ........ 366/144–149, 366/155.1, 181.3, 182.3, 182.4, 189, 192–194; 426/465, 519–521; 34/386, 391–396; 99/470
See application file for complete search history.

(56) References Cited

U.S. PATENT DOCUMENTS 114,891 A * 5/1871 Waitt ........................... 426/627
1,422,102 A * 7/1922 Hutchinson ................. 426/622

(Continued)

FOREIGN PATENT DOCUMENTS

DE 199 04 994 8/2000

(Continued)

OTHER PUBLICATIONS

Memorandum to Parties Involved Conclusion of Opposition Proceedings, Mar. 24, 2005.
Conclusion of Opposition Proceeding for Patent 00901475.4, Mar. 20, 2005.

(Continued)

*Primary Examiner*—David Sorkin
(74) *Attorney, Agent, or Firm*—Merchant & Gould P.C.

(57) ABSTRACT

This invention relates to a method and a device for thermally treating flour, especially middlings, for hygienic purposes. The device includes modules which are a first, heatable batch mixer (4) with a pre-mounted depot (1). The batch mixer is connected to a drier/cooler (8) via a lock-like flap system (3). A second batch mixer (12) includes a device (14) for adding additives and a discharge device is mounted behind an additional flap system (11) that is mounted behind the drier/cooler (8).

12 Claims, 1 Drawing Sheet

U.S. PATENT DOCUMENTS

| | | | | |
|---|---|---|---|---|
| 1,452,871 | A | * | 4/1923 | Dienst .................. 426/465 |
| 2,837,403 | A | * | 6/1958 | Gloss et al. ............ 423/208 |
| 3,445,239 | A | * | 5/1969 | Viault .................. 426/458 |
| 3,519,431 | A | * | 7/1970 | Wayne .................. 426/417 |
| 4,424,301 | A | * | 1/1984 | Klippert et al. ......... 525/53 |
| 6,367,960 | B1 | * | 4/2002 | Yamazaki et al. ........ 366/149 |

FOREIGN PATENT DOCUMENTS

| | | |
|---|---|---|
| EP | 0 219 471 | 12/1989 |
| EP | 0 210 966 | 5/1991 |
| EP | 0 685 255 A1 | 12/1995 |
| EP | 0 685 255 B1 | 12/1995 |
| IE | 930995 | 6/1995 |
| SU | 697127 | 11/1979 |
| WO | WO 98/43682 | 10/1998 |

OTHER PUBLICATIONS

Decision rejecting the opposition (Article 102(2) EPC), Mar. 24, 2005.
Grounds for decision (Annex), Dec. 8, 2004.
Minutes of the oral proceeding (Opposition division), Dec. 8, 2004.
Transmission of Signature Copy pursuant to Rule 76(4) of the EPC, Dec. 8, 2005.
Letter regarding the Opposition procedure, Nov. 19, 2004.
Response to the Notification of the EPO dated Aug. 27, 2003 concerning the Opposition, Jan. 16, 2004.

* cited by examiner

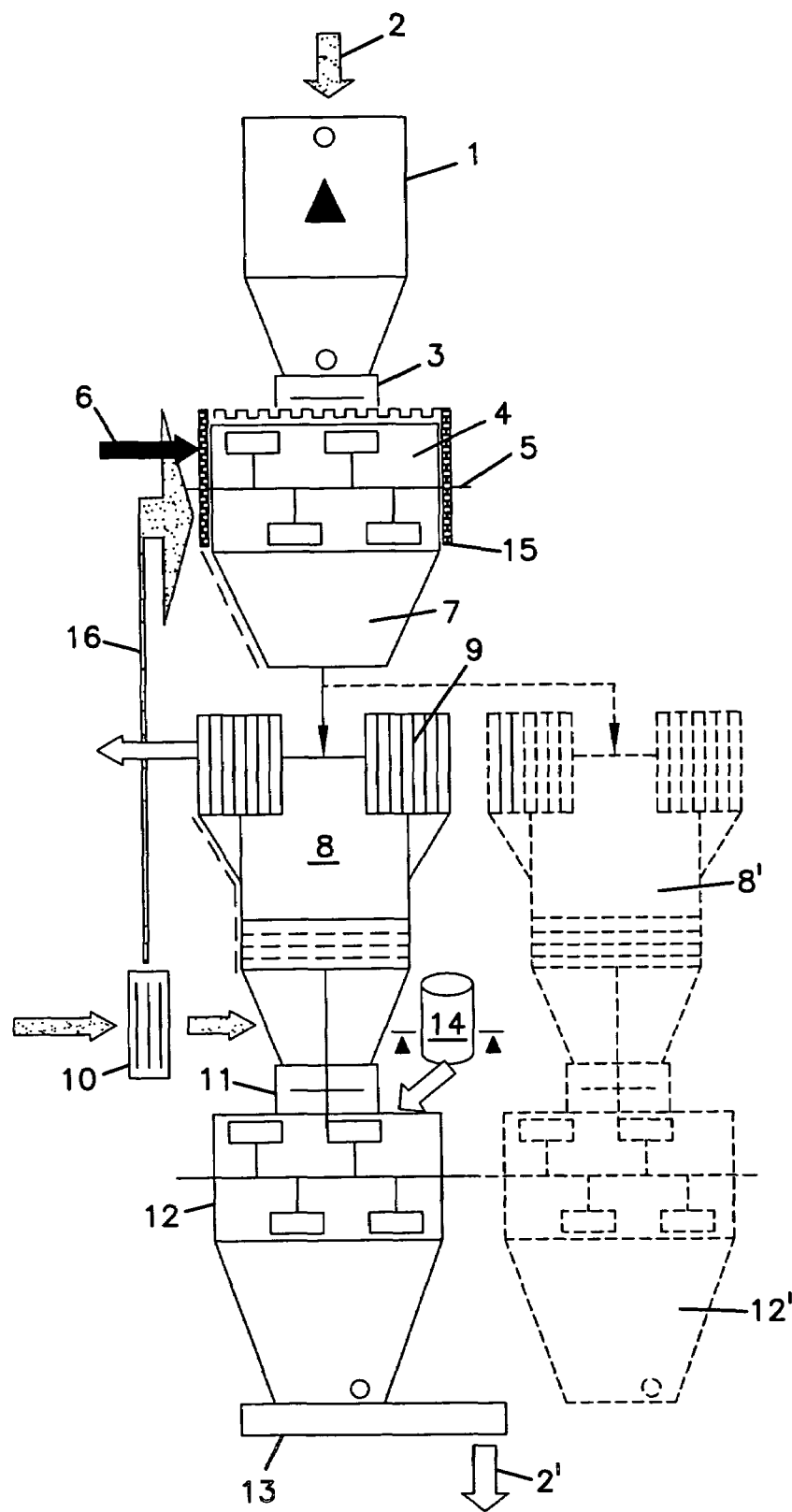

DEVICE FOR THERMAL TREATMENT OF FLOUR FOR HYGIENIC PURPOSES

This invention relates to a method and device for thermally treating flour and similar free-flowing food and feed products as well as a device for carrying out this method. In particular, this invention relates to the thermal treatment of feed meal and flour.

Methods are known for hygienic treatment or sterilization of pellets or powdery substances that are used as human and/or animal feed products. This requires an adequate thermal and/or hydrothermal treatment to kill or at least inactivate microorganisms. This treatment is followed by cooling. In a continuous operation, this results in different holding times and uneven conditions at the beginning and end of the treatment operation.

International Patent WO98/43682 concerns a batch method of sterilizing granules and the like, where the product is heated to a sterilization temperature by means of steam in a chamber of a mixing apparatus. After this heating, the product goes to a second chamber beneath that, where it is subject to a holding time until it is discharged. The heat treatment of the product takes place with the product in a fluidized state. The two chambers are separated from one another by means of closable discharge openings. The volume of the second chamber is larger than the volume of the first chamber.

According to European Patent B 219,471, the mixing unit consists of a mixing chamber with rotating mixing paddles and a misting device in the form of a rotating line roller.

According to European Patent B 210,966, such a mixer may also have means for lateral feed of a cooling agent or a drying agent.

In addition, it can also be regarded as known to provide such units with additional cooling and drying equipment, where the suggested solutions have been based on rigid and thus inflexible combinations because in most cases continuous operation of large quantities of product is assumed. The above-mentioned types of equipment usually have long inclinations and transitions, which can lead to conveyance problems and temperature differences.

The object of this invention is to develop a method of thermal treatment of flour and meal for hygienic purposes, especially for thermal treatment of feed meal which will avoid the disadvantages of the state of the art and will also permit efficient treatment of even small batches.

Another object of this invention is create a device for thermal treatment of flour, especially feed meal, for hygienic purposes.

Advantageous embodiments are also disclosed.

The basic idea of this invention consists of first performing a thermal treatment, e.g., of feed meal in a mixer, preferably a batch mixer, at first in accordance with the state of the art, and then drying and cooling the treated product and only then adding sensitive additives to the batch in a subsequent mixer, where they are incorporated.

This not only allows an adaptation to different batch sizes but also avoids the problem of condensation and prevents damage to the additives during the thermal treatment. The latter also makes it possible to add smaller amounts of additives such as antibiotics. The equipment used for this may be set up in a modular fashion, permitting a great variation in designs.

The method according to this invention permits a very short set-up time, rapid product changes and reliable thermal conditions without the risk of condensation, thus eliminating a significant source of contamination.

This invention will be described in greater detail below in an embodiment on the basis of a drawing. In the drawing, the only figure shows a schematic diagram of a device for thermal treatment of feed meal for hygienic purposes.

This device has a depot 1 which is filled with the product to be treated (feed meal). The depot 1 is connected to a mixer 4 by a flap valve system 3, where the flap valve system 3 permits an airtight separation between the depot 1 and the mixer 4.

The mixer 4 is a batch mixer, preferably designed according to Swiss Patent 1333/94 or European Patent A 685,255 and having a mixer shaft 5 with mixing paddles as well as a device for steam feed 6.

The product outlet 7 of the mixer 4 is connected to a dryer/cooler 8 which is equipped with a filter 9 for exhaust air purification. Likewise, a heating register 10 is also provided. Both hot air for drying the product and cool air can be generated.

The dryer/cooler 8 is connected by another valve system 11 to another batch mixer 12 which is designed like batch mixer 4. A discharge device such as a discharge screw 13 is provided at the product outlet of the batch mixer 12 for discharging the treated feed meal 2'.

The batch mixer 12 also has a device 14 for adding solid or liquid substances which are sensitive to heat; this device has nozzle bars (17). Such devices are described in German Patent Application P19904994.7 by the present applicant, which was not published previously, and they may also include small component scales or the like.

To increase the capacity of the device, the dryer/cooler 8' and/or batch mixer 12' may also be connected in parallel.

The batch mixer 4 also has a heater 15, and the entire system can be sterilized with hot air through a corresponding heating management 16 or it can be cleaned with cool air. This guarantees a high level of cleanliness, short cleaning times and rapid product change. The parts of the device which come in contact with product have inclined surfaces which thus tend to collect less dirt (at the same time, they also yield the lowest risk of entrainment).

The feed meal 2 to be treated goes first into depot 1 and then goes through the lock-like valve system 3 in to the batch mixer 4, where the product 2 is heated, which is accelerated by thorough mixing of the product 2 by mixing paddles on the mixer shaft 5 (short dwell time), thus yielding a high degree of uniformity in conditioning. The resulting heating temperature to be set depends on the desired degree of sterility as well as other factors.

Due to the subsequent drying and cooling in a separate dryer/cooler 8, not only is condensation largely prevented but also the next batch can already be treated in batch mixer 4. Corresponding closing devices (not shown) are provided between the individual components.

Product dust goes to the filter 9, and the purified exhaust air can be discharged to the environment or it can be reused in circulating air. This process is controlled in such a way that the resulting filtered dust is returned to the processed batch of product feed meal 2 without any risk of entrainment.

Then any required additives are added to the cooled and dried product 2' in batch mixer 12, and then the product is discharged by means of the discharge screw 13.

NOMENCLATURE 1 depot
2 feed meal
2'feed meal 3 valve system
4 batch mixer
5 mixer shaft
6 steam feed
7 product outlet
8 dryer/cooler
8' dryer/cooler
9 filter
10 heating register
11 valve system
12 batch mixer
12' batch mixer
13 discharge screw
14 device
15 heating
16 heating guide

The invention claimed is:

1. A device for a thermal treatment of flour for hygienic purposes, the device comprising:
   a heatable batch mixer,
   a drying and cooling unit,
   a filter, and
   a discharge,
   wherein the heatable batch mixer is connected to the drying and cooling unit, and
   wherein the drying and cooling unit is connected by a flap system to a second batch mixer having devices for adding additives.

2. The device according to claim 1, wherein the second batch mixer has a device having nozzle bars.

3. The device according to claim 2, further comprising a heating duct of a heating register for hygienic treatment or for cleaning of the device.

4. The device according to claim 1, further comprising another drying and cooling unit and/or batch mixer acting independently of one another.

5. The device according to claim 1, further comprising a heating duct of a heating register for hygienic treatment or for cleaning of the device.

6. The device according to claim 1, further comprising another drying and cooling unit and/or batch mixer acting independently of one another.

7. A device for thermally treating flour for hygienic purposes, the device comprising:
   a heatable batch mixer,
   a drying and cooling unit having a filter, wherein the mixer is connected to the drying and cooling unit,
   a second batch mixer having a device for adding additives, wherein a flap system connects the drying and cooling unit to the second batch mixer, and
   a discharge.

8. The device according to claim 7, wherein the device for adding additives includes nozzle bars.

9. The device according to claim 8, further comprising a heating duct of a heating register for hygienic treatment or for cleaning of the device.

10. The device according to claim 8, further comprising another drying and cooling unit and another batch mixer acting independently of one another.

11. The device according to claim 7, further comprising a heating duct of a heating register for hygienic treatment or for cleaning of the device.

12. The device according to claim 7, further comprising another drying and cooling unit and another batch mixer acting independently of one another.

* * * * *